(12) United States Patent
Iverson et al.

(10) Patent No.: US 6,839,842 B1
(45) Date of Patent: *Jan. 4, 2005

(54) METHOD AND APPARATUS FOR AUTHENTICATING INFORMATION

(75) Inventors: Vaughn Scott Iverson, Beaverton, OR (US); John Whitley Richardson, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 994 days.

(21) Appl. No.: 08/775,077

(22) Filed: Dec. 27, 1996

(51) Int. Cl.$^7$ .................................................. H04L 9/00
(52) U.S. Cl. ...................................................... 713/176
(58) Field of Search ...................... 340/825.34; 705/44; 380/25, 4; 713/176

(56) References Cited

U.S. PATENT DOCUMENTS

| | | | | |
|---|---|---|---|---|
| 5,136,646 A | * | 8/1992 | Haber et al. | 380/49 |
| 5,191,613 A | * | 3/1993 | Graziano et al. | 380/25 |
| 5,267,573 A | * | 12/1993 | Evans et al. | 128/772 |
| 5,319,705 A | * | 6/1994 | Halter et al. | 380/4 |
| 5,337,360 A | * | 8/1994 | Fischer | 380/23 |
| 5,390,247 A | * | 2/1995 | Fischer | 380/25 |
| 5,481,720 A | * | 1/1996 | Loucks et al. | |
| 5,509,123 A | * | 4/1996 | Dobbins et al. | 395/200.15 |
| 5,606,609 A | * | 2/1997 | Houser et al. | 380/4 |
| 5,680,461 A | * | 10/1997 | McManis | 380/25 |
| 5,953,419 A | * | 9/1999 | Lohstroh et al. | 380/21 |
| 6,006,328 A | * | 12/1999 | Drake | 713/200 |

OTHER PUBLICATIONS

Microsoft Press Computer Dictionary 1997, Microsoft Press, 3$^{rd}$ Ed., p. 337.*

* cited by examiner

*Primary Examiner*—Andrew Caldwell
(74) *Attorney, Agent, or Firm*—Kenyon & Kenyon

(57) ABSTRACT

An information object configured for automatic authentication of information contained therein includes an information segment to be authenticated, an authenticator address corresponding to a predetermined authenticator, and a set of instructions for establishing a communications link between the information object and the predetermined authenticator using the authenticator address, transmitting an authentication request to the predetermined authenticator, and receiving a responsive communication from the predetermined authenticator for authenticating the information segment.

12 Claims, 2 Drawing Sheets

METHOD AND APPARATUS FOR AUTHENTICATING INFORMATION

BACKGROUND OF THE INVENTION

The present invention relates generally to the fields of data encryption and digital signatures, and in particular to a computer-implemented method and apparatus for automatically authenticating electronically-represented information.

With the rapid growth in popularity of personal computers (PCs) in an increasingly "Internetworked" world, it has become critical that the source, accuracy and integrity of information can be trusted and verified. Current data encryption and digital signature technologies have done much to provide the tools for building a stable foundation for such trust.

Unfortunately, existing authentication technologies are often difficult to understand and cumbersome to use, typically involving a highly-manual process requiring different tools to create a document, digitally sign it, transmit it, receive it, verify its authenticity, and finally display it. There is presently no user-friendly mechanism for automatically authenticating electronically-represented information.

SUMMARY OF THE INVENTION

An embodiment of the present invention provides an information object configured for automatic authentication of information contained therein. The information object includes an information segment to be authenticated, an authenticator address corresponding to a predetermined authenticator, and a set of instructions for establishing a communications link between the information object and the predetermined authenticator using the authenticator address, transmitting an authentication request to the predetermined authenticator, and receiving a responsive communication from the predetermined authenticator for authenticating the information segment.

DETAILED DESCRIPTION

Using currently-known digital signature technology, such as PGP (Pretty Good Privacy) or some other RSA-based public key cryptosystem (developed by RSA Data Security, Inc.), an information provider (the "authenticator") may create a piece of information and digitally "sign" it. Such technologies are described in an Apple Computer white paper by Steve Fisher entitled Digital Signatures, incorporated herein by reference.

For example, a university might provide an electronic transcript for a student and authenticate the information by digitally signing, or encrypting, a non-invertible "hash" of the document with the university's secretly-held "private key." This digital signature is then transmitted along with the transcript. The digital signature may be used by a recipient of the electronic transcript, such as a prospective employer, to assure two things: (1) the document actually came from the university; and (2) the document has not been modified or altered in any way. The recipient may obtain this assurance by decrypting the digital signature using the university's "public key" and then matching the result against a hash of the original document. If the hash of the original document matches the decrypted hash, the recipient may assume that the document has not been changed since being encrypted.

Figure 1:
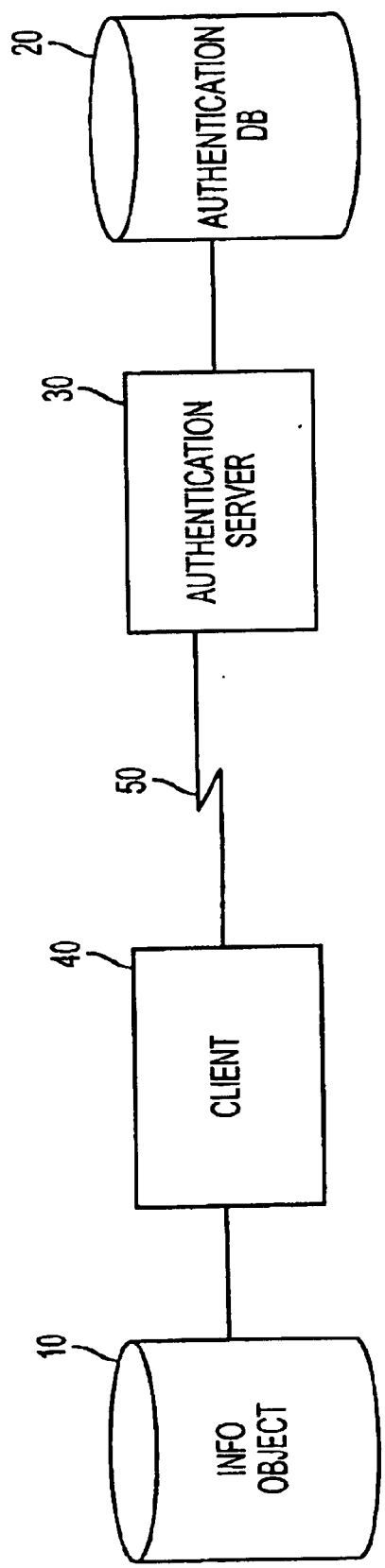
FIG. 1 is a block diagram illustrating an embodiment of the present invention.

Referring now to FIG. 1, according to an embodiment of the present invention, a information object 10 may be provided to a user of client device 40. Client device 40 may access authentication server 30 over communications link 50 to, for example, authenticate information contained in information object 10. To perform the requested authentication, authentication server 30 may access an authentication database 20. Authentication server 30 may then communicate the results of the authentication to client device 40.

In the embodiment of FIG. 1, client device 40 may comprise, for example, a desktop personal computer, a mobile computer, a personal data system (PDS), or any other device capable of supporting basic data processing and communications functionality. The present invention is not dependent upon the use of any particular type of computer or other device.

According to this embodiment, client device 40 may include a communications interface (not shown), such as an internal or external modem, enabling client device 40 to communicate with authentication server 30 over communications link 50. Communications link 50 may comprise, for example, a local area network (LAN), a wide area network (WAN), a POTS (Plain Old Telephone System) or wireless dial-up connection, or any other means for inter-device data communications. Again, the present invention is not dependent upon the use of any particular means of communication.

In this embodiment, authentication server 30 is a predetermined authenticator of information, and may comprise, for example, a desktop personal computer configured as a dedicated network server. As with client device 40, however, the scope of the present invention is not limited in this regard. Authentication server 30 may be any computer or other device capable of supporting basic data processing and communications functionality. Authentication server 30 may be configured to communicate with a plurality of client devices 40.

In the embodiment illustrated in FIG. 1, authentication server 30 may be coupled to an authentication database 20. Authentication database 20 may reside in a memory of authentication server 30 or, alternatively, may reside on a separate device to which authentication server 30 has access, such as a dedicated database server or a mainframe computer. In this particular embodiment, authentication server 30 may retrieve information from authentication database 20 using a standard protocol, such as SQL (Structured Query Language), that is supported by the architecture of authentication database 20.

Figure 2:
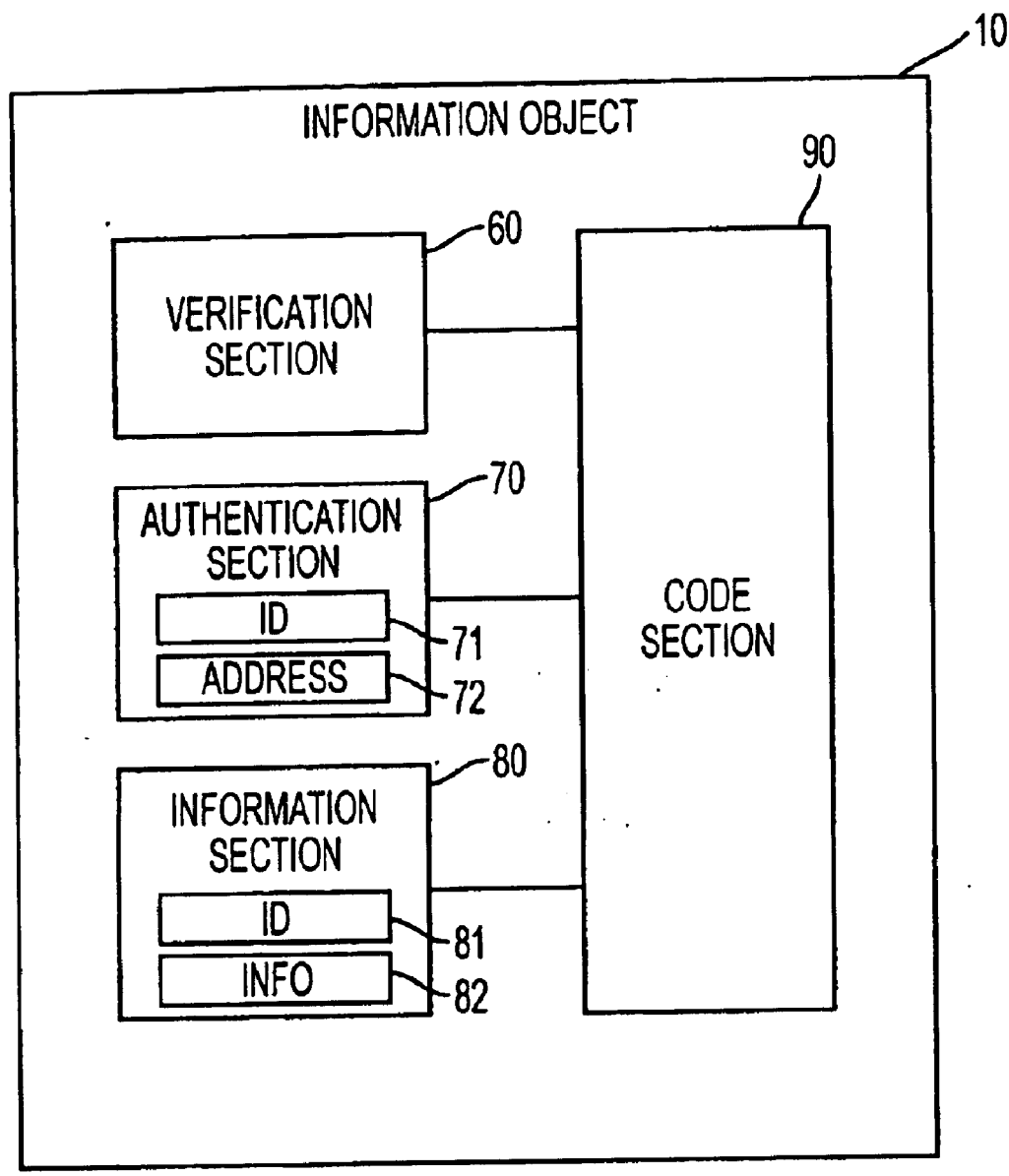
FIG. 2 is schematic diagram illustrating an information object according to an embodiment of the present invention.

FIG. 2 is a schematic diagram illustrating an information object 10 configured according to an embodiment of the present invention. Information object 10 may be implemented, for example, using known object embedding technologies. Examples of applications providing suitable object embedding functionality include OLE (Object Linking and Embedding) and OpenDoc (developed by IBM and others). The present invention is not limited, however, to any particular method or means for object embedding.

Information object 10 may be embedded in any type of data entity, such as an application-specific file or comparable structure, capable of being transmitted and/or stored on a medium. Examples of such data entities include wordprocessor documents, spreadsheets, presentations, graphical images, CAD (Computer-Aided Design) files, and so on. For ease of reference, such data entities are referred to generally herein as data files; however, the present invention is not dependent upon any particular file type, data structure, storage medium, or other limitation with respect to the type of entity in which information object 10 may be embedded.

In the embodiment illustrated in FIG. 2, information object 10 may comprise a uniform data structure including a verification section 60, an authenticator section 70, and an information section 80. In addition, information object 10 may include a code section 90. The various sections of information object 10 shown in FIG. 2 are identified primarily to assist in describing features of the present embodiment. In practice, verification section 60, authenticator section 70, information section 80 and code section 90 may comprise separate address ranges within information object 10 as it is stored in a memory of client device 40, authentication server 30, or some other storage medium such as a diskette or CD-ROM. Information object 10 need not include any separately identifiable "sections," however, so long as it is possible to definitively locate information within information object 10 used for the various authentication-related functions described herein.

Looking more closely at the content which may be included in information object 10, in this particular embodiment information section 80 includes an Info_ID 81 and an Info_Segment 82. Info_ID 81 may be used, for example, to uniquely identify Info_Segment 82 for purposes of authentication. Info_Segment 82 may comprise, for example, a digital representation of a fact or a collection of facts. Info_Segment 82 may be formatted as "plaintext" (non-encrypted information) or "ciphertext" (encrypted information).

Still referring to the embodiment illustrated in FIG. 2, authentication section 70 includes an Authenticator_ID 71 and an associated Authenticator_Address 72. Authenticator_ID 71 may include descriptive information relating to an entity authorized to authenticate the contents of Info_Segment 82, such as a name of the authenticator, an e-mail address, or a telephone number. In this particular embodiment, Authenticator_Address 72 comprises a TCP/IP (Transmission Control Protocol/Internet Protocol) address or a URL (Uniform Resource Locator) specifying a network address at which the authenticator may be contacted to authenticate Info_Segment 82. The scope of the present invention is not limited, however, to communications over the Internet. Accordingly, Authenticator_Address 72 may comprise any form of address which enables a recipient of information object 10 to electronically communicate with an authenticator of Info_Segment 82. Moreover, while FIG. 2 illustrates only a single Authenticator_ID 71 and Authenticator_Address 72, in other embodiments authentication section 70 may include information relating to a plurality of authenticators. Such authenticators may be arranged (physically and/or logically) in a hierarchy, presenting a recipient of information object 10 with a choice of progressively more "trusted" authenticators.

In the embodiment illustrated in FIG. 2, verification section 60 may provide a mechanism enabling a recipient to confirm the source of Info_Segment 82 and determine whether Info_Segment 82 has been altered since being placed into information object 10. Verification section 60 may comprise, for example, a "public key" which may be used to decrypt a digital signature provided by an authenticator, and a "hash" of Info_Segment 82 to compare to the decrypted digital signature.

In the present embodiment, the originator of Info_Segment 82 (who may or may not be an authenticator) may create a digital signature by generating a "hash" of Info_Segment 82 and encrypting the hash using a "private key" it maintains in secrecy. The hash may be generated using any known hashing algorithm, and essentially provides a miniature fingerprint of the hashed content. Verifying the digital signature may then be accomplished by decrypting the digital signature using the public key in verification section 60, and matching the result against the hash also included in verification section 60. Public-key cryptography of this type is described more fully in a Microsoft Corporation white paper entitled Microsoft Internet Security Framework, incorporated herein by reference. The present invention does not depend on the use of any particular cryptographic method, and the scope of the present invention is not limited in this regard.

In the embodiment illustrated in FIG. 2, code section 90 of information object 10 provides functionality used to authenticate Info_Segment 82. Code section 90 may comprise, for example, instructions for: establishing a communications link from the recipient of information object 10 to an authenticator identified in authentication section 70; informing the authenticator of the Info_Segment 82 to be authenticated (such as by passing Info_ID 81); obtaining a digital signature; and verifying Info_Segment 82. Other functionality may also be provided through code section 90, such as performing the above-described verification of a digital signature or, as is discussed below, obtaining an Update of Info_Segment 82 from an authenticator. Some or all of the functionality provided through code section 90 may be implemented using built-in features of known object embedding technologies. Alternatively, some combination of such built-in features and specialized executable instructions included in code section 90 may be used.

The above-mentioned student transcript example may be used to further illustrate features and advantages provided by embodiments of the present invention. Where applicable, structural elements will be identified using the corresponding reference numbers used in FIG. 1 and FIG. 2.

To illustrate an embodiment of the present invention, assume a student requests an electronic copy of his transcript from the university for use in job hunting. The university may process that request by loading the transcript into an object embedding application to generate an embeddable information object 10 including the transcript. The information object 10 may then be provided to the requesting student by, for example, electronically transmitting a data stream or furnishing the student with a file on diskette.

Further assume that the student wishes to include his cumulative grade-point average (GPA) in an electronic version of his resume to be provided to a prospective employer. The student may embed the university-provided information object 10 into a document file containing an electronic version of his resume using, for example, a standard word processing application, and include a link for displaying the GPA. The document file may then be provided to the prospective employer.

When the prospective employer opens the document file to read it (using a compatible word processing application), the embedded information object 10 is activated to provide the GPA to the word processor. This functionality may be accomplished using OLE, OpenDoc, or any other standard object embedding technology. The activated information object 10 may then use address information from the authenticator section 70 to establish a connection to an authentication server 30 maintained by the university, after which information object 10 may pass Info_ID 81 (corresponding to the GPA) to be authenticated. Upon receipt of Info_ID 81, authentication server 30 may search authentication database 20 to determine whether the GPA is valid. Assuming the GPA is valid, authentication server 30 may transmit a digital signature to information object 10.

Upon receipt of the digital signature, information object 10 may use the university's public key (from, for example, verification section 60) to decrypt the digital signature. Information object 10 may then compare the decrypted digital signature to a reference hash in verification section 60. Alternatively, information object 10 may execute a comparable hash function against Info_Segment 82 to dynamically generate a reference hash. If the two hashes match, the embedded information object supplies the GPA to the word processor and the reader sees it along with the other information in the resume. It can be seen from the foregoing description that authentication of Info_Segment 82 may be accomplished in a manner that is completely transparent to the reader of the student's resume.

According to another embodiment, the embedded information object 10 may be configured to obtain certification of an authenticator address and public key contained therein prior to attempting to establish a connection to authentication server 30. As is known in the art, such certification may be accomplished using the services of a certificate authority (CA). A certificate authority is a commonly-trusted third-party, similar to a notary public, which may be relied upon to verify the matching of public encryption keys to such information as identity, e-mail name, or any other information useful for identification purposes (including issuance of credit, access privilege, and so on). Certification is described more fully in the Microsoft Internet Security Framework (available from Microsoft Corporation), incorporated herein by reference.

According to yet another embodiment, the embedded information object 10 may be configured to determine whether a newer version of information contained therein exists and, if so, automatically update information object 10 with the current version. With reference to the above example, the student's final grades may have been posted since generation of the transcript object. In such a case, authentication server 30 may be configured to determine that the transcript associated with Info_ID 81 forwarded by the prospective employer for authentication is no longer valid, and automatically update information object 10 with a new transcript. In a desirable variation on this embodiment, authentication server 30 may first verify the identity of the prospective employer (using a certificate authority) and/or verify that the prospective employer is in possession of the original (now invalid) transcript. The new transcript would immediately replace the old one, and the new GPA would thus appear in the resume.

The foregoing example was provided merely to illustrate how certain embodiments of the present invention may be used to simplify the authentication and updating of electronically-represented information in a user-friendly manner, and is not intended to limit the scope of the present invention in any way. Many other useful applications of embodiments of the present invention are possible, such as information security, billing, recipient verification, and tracking the movement of information between recipients.

The foregoing is a detailed description of particular embodiments of the present invention. The invention embraces all alternatives, modifications and variations that fall within the letter and spirit of the claims, as well as all equivalents of the claimed subject matter. For example, rather than using public-key cryptographic techniques, other known encryption techniques may be applied. One such alternative encryption method is known as symmetric cryptography, common examples of which are RC4 (developed by RSA Data Security, Inc.) and Data Encryption Standard (DES) (adopted as a standard by the U.S. National Security Agency). Combinations of public-key and symmetric cryptography are also possible. Likewise, rather than including a public key in an information object, the information object may be configured to retrieve a cryptographic key from an authentication server on an ad hoc basis. Also, data verification techniques other than digital signatures may be used, such as the use of check sums. Persons skilled in the art will recognize that many other alternatives, modifications and variations are possible.

What is claimed is:

1. An automatically-authenticating information object embodied in a computer-readable storage medium accessible from a first computer, said automatically-authenticating information object comprising:
   an information segment to be authenticated;
   an authenticator address corresponding to a predetermined authenticator resident on a second computer, the predetermined authenticator comprising an application configured to perform authentication of the information segment; and
   a set of instructions for automatically authenticating the information segment when an attempt is made to access said information segment, said set of instructions including instructions for establishing a communications link between said automatically-authenticating information object on said first computer and said predetermined authenticator on said second computer using said authenticator address, transmitting an authentication request from the automatically-authenticating information object to said predetermined authenticator, receiving a responsive communication from said predetermined authenticator, and permitting the information segment to be accessed if the responsive communication indicates that the information segment is authentic.

2. The automatically-authenticating information object of claim 1, wherein said authentication request comprises a unique identifier for said information segment.

3. The automatically-authenticating information object of claim 1, wherein said responsive communication from said predetermined authenticator comprises a digital signature.

4. The automatically-authenticating information object of claim 1, wherein said responsive communication from said predetermined authenticator comprises an update to be applied to said information segment.

5. The automatically authenticating information object of claim 1, wherein said set of instructions further comprises instructions for preventing an inauthentic information segment from being viewed.

6. The automatically-authenticating information object of claim 1, wherein said set of instructions further comprises instructions for generating a warning message if said information segment is inauthentic.

7. A method for automatically authenticating electronically-represented information, said method comprising the steps of:
   including an information segment to be authenticated in an automatically-authenticating information object embodied in a computer-readable storage medium;
   embedding said automatically-authenticating information object in a data file;

loading the data file on a first computer;

automatically activating said automatically-authenticating information object when said data file is opened, wherein said automatically-authenticating information object establishes a communications link to a predetermined authenticator of said information segment resident on a second computer, transmits an authentication request to said predetermined authenticator, receives a responsive communication from said predetermined authenticator, and controlling access to said information segment based upon said responsive communication, said predetermined authenticator comprising an application installed on the second computer.

8. The method of claim 7, wherein said responsive communication from said predetermined authenticator comprises a digital signature.

9. The method of claim 7, wherein said responsive communication from said predetermined authenticator comprises an update for said information segment, said method further comprising the step of applying said update to said information segment.

10. The method of claim 9, wherein said predetermined authenticator confirms that an originator of said authentication request possesses a previously authentic version of said information segment prior to transmitting said update.

11. The method of claim 7, further comprising the step of preventing an inauthentic information segment from being viewed.

12. The method of claim 7, further comprising the step of generating a warning message if said information segment is inauthentic.

* * * * *